June 5, 1951 C. F. SCHULTZ 2,555,706
VEHICLE LICENSE PLATE HOLDER
Filed March 14, 1947 2 Sheets-Sheet 1
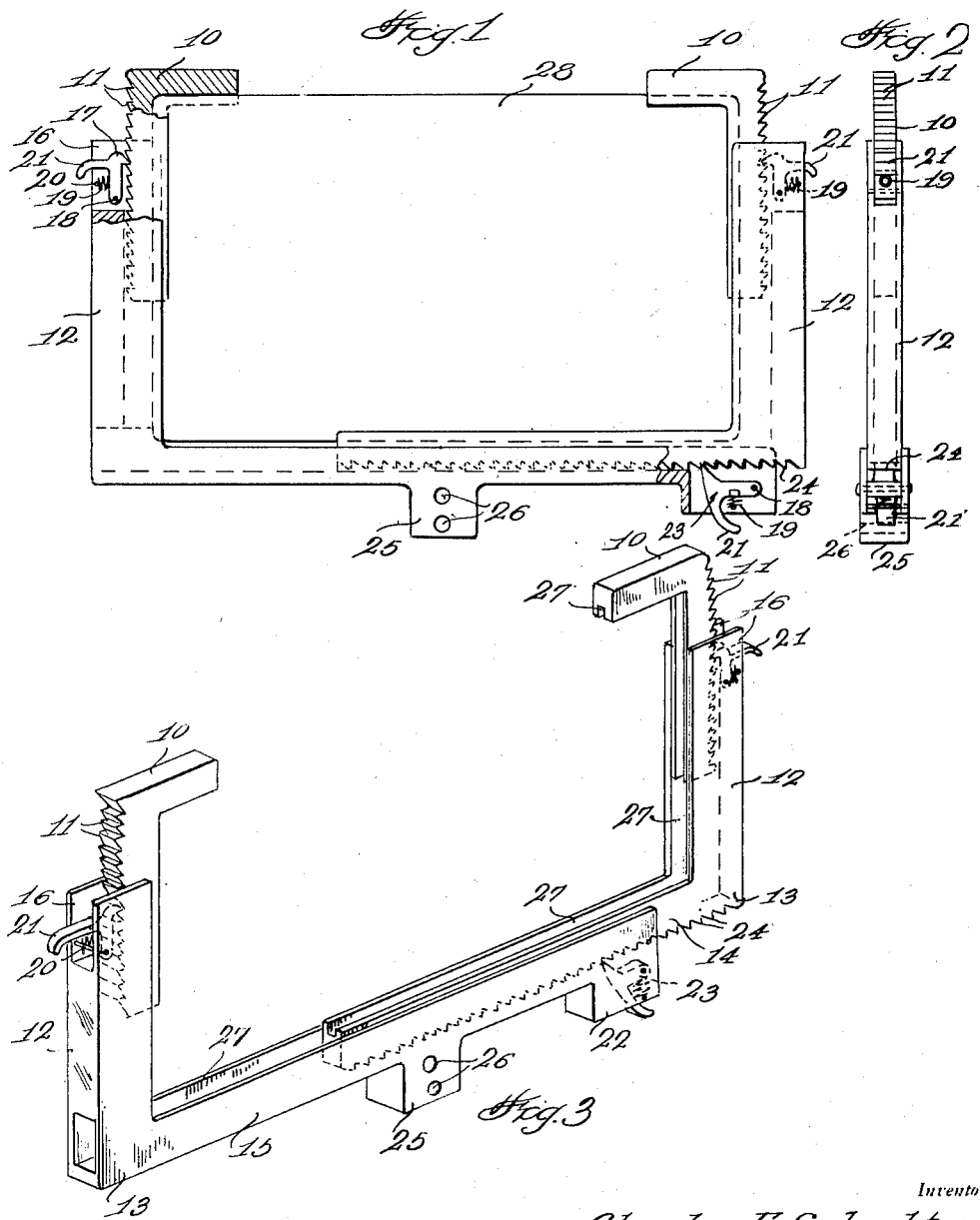
Inventor
Charlie F. Schultz
By Randolph & Beavers
Attorneys June 5, 1951     C. F. SCHULTZ     2,555,706
VEHICLE LICENSE PLATE HOLDER
Filed March 14, 1947     2 Sheets-Sheet 2
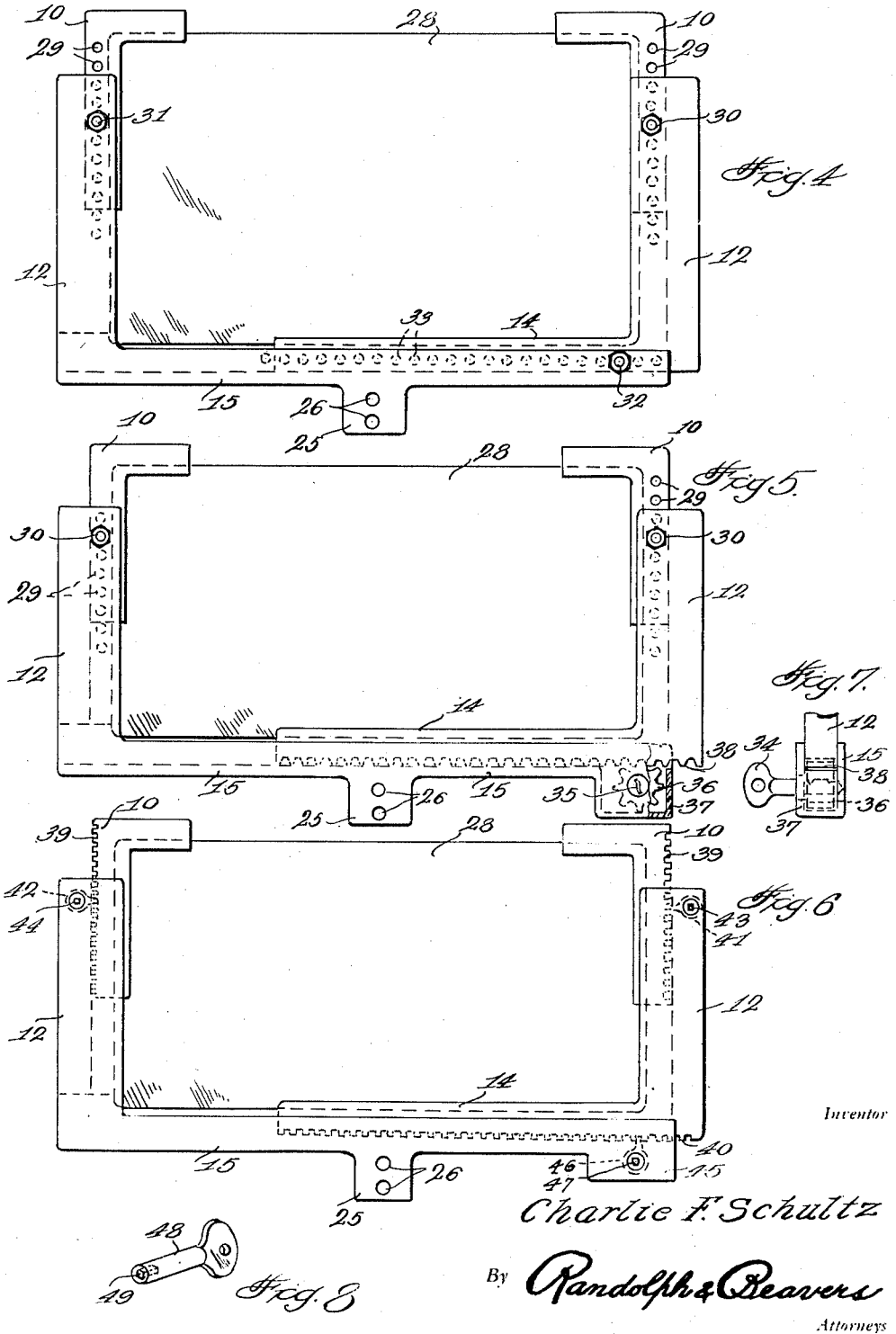
Inventor
Charlie F. Schultz
By Randolph & Beavers
Attorneys Patented June 5, 1951

2,555,706

UNITED STATES PATENT OFFICE 2,555,706

VEHICLE LICENSE PLATE HOLDER

Charlie F. Schultz, Belle Plaine, Minn.

Application March 14, 1947, Serial No. 734,688

7 Claims. (Cl. 40—125)

The present invention relates to motor vehicle license plate holders and it consists in the combinations, constructions and arrangements of parts herein described and claimed.

Generally the invention comprises a license plate holder or frame which may be made of Monel metal, chromium plated material or other attractive substance. In all forms of the invention the framework is divided into four relatively movable sections which may be adjusted to fit various sized plates. In certain forms of the invention this may be effected by means of racks and interlocking dogs. In other forms of the invention bolts may be interfitted into certain of pluralities of openings provided in the sections. In other forms of the invention keys and racks may be provided to effect the adjustment of the sections of the frame to fit a particular license plate. In all cases the sections are interiorly grooved to receive the edges of the license plate.

It is accordingly an object of the invention to provide a simple, inexpensive, efficient and attractive means for holding a license plate.

A further object of the invention is the provision of an adjustable license plate holder which is adapted to be operated only by means of a key.

Other and further objects of the invention will become apparent from a reading of the following specification taken in conjunction with the drawings, in which:

Figure 1 is an elevational view, partly broken away, of an embodiment of the invention, Figure 2 is a side elevational view of the device shown in Figure 1.

Figure 3 is a perspective view of the device shown in Figures 1 and 2,

Figure 4 is an elevational view of a modified form of the invention,

Figure 5 is an elevational view, partly broken away, of another form the invention may take, Figure 6 is an elevational view of another modified form of the invention, and Figures 7 and 8 illustrate certain details of the invention.

Referring more particularly to the drawings, there is shown therein a license plate holder comprising a pair of right angular top members 10 each provided with a series of serrations 11 upon their outer vertical sides. The vertical sides are adapted to slidably fit within vertical portions 12 of a pair of bottom right angular members 13 one of whose horizontal portions 14 is adapted to slidably fit within the horizontal portion 15 of the other. The outer upper ends of the vertical portions 12 of the lower right angular members are provided with cut out portions 16 within each of which is mounted a dog 17 pivoted as indicated at 18 and normally urged into engagement with the serrations 11 by means of a compression spring 19 which bears against the dog 17 and a detent 20. The dogs 17 are provided with integrally formed finger pieces 21 which extend slightly beyond the outer planes of the members 12.

The portion 15 of the member 13 is provided with a housing 22 in which is mounted a dog 23 which is similar in all respects to the dogs 17 and which is adapted to engage with serrations 24 cut in the portion 14 of the member 13. Approximately centrally of the entire device and formed integrally with the portion 15 is a dependant lug 25 having openings 26 for bolting the frame as an entirety to the conventional frame holder.

Each of the frame sections 10 and 13 are interiorly grooved as indicated at 27.

In operation, it will be apparent that, in order to mount a license plate as for example, that indicated at 28, within the frame, it is only necessary to operate the finger piece of the dog 23 from the serration 24 and move the sections 13 away from each other and to operate the finger pieces 21 and move the sections 10 away from the sections 13. The plate 28 is then placed in the groove 27 in the portions 14 and 15 and the sections 13 then brought toward each other until the grooves 27 in the portions 12 engage the sides of the plate 28 whereupon the sections 10 are moved downwardly until the horizontal portions thereof engage the top of the plate.

In the modified forms of the invention hereinafter to be described, identical figures will be used for parts similar to those hereinabove described. In Figure 4, for example instead of the spring pressed dogs and serrations of the device disclosed in Figures 1 to 3, inclusive, the members 10 are provided with a series of closely aligned openings 29 in the vertical portions thereof and the portions 12 of the lower sections of the frame are each provided with a single opening for the reception of bolts 30 and 31, respectively, which are each adapted to pass through one of the openings 29 to hold the sections 10 in adjusted positions. The portion 15 is provided with an opening and a bolt 32 and the portion 14 with a plurality of openings 33 which will cooperate with the bolt in like manner.

The operation of this form of the invention is identical with that outlined with respect to the device shown in Figure 1 except that the sections in this case are bolted together instead of being held in position by the dogs 17 and serrations 11.

In Figure 5 there is disclosed a further modification of the invention in which the plate holder is adjusted by means of a key 34 adapted to fit within a keyhole 35 cut within a gear 36 mounted in a housing 37 formed integrally with the portion 15 of the frame and adapted to enmesh with a rack 38 formed in the lower face of the portion 14. The sections 10 engage with the sections 12 in the identical manner defined with regard to the form of the invention disclosed in Figure 4.

In operation, it will be readily apparent that the keyhole 35 may be adapted to fit the ignition or door key of the particular car in order to simplify the driver's problems.

In the form of the invention disclosed in Figure 6 the members 10 are provided with racks 39 on the outer vertical faces thereof and the portion 14 is provided on its lower face with a rack 40. The portions 12 have each revolubly mounted therein a single-toothed gear 41 and 42, respectively, and a square protruding shaft 43 and 44, respectively. The portion 15 is provided with a housing 45 having a single-toothed gear 46 mounted therein which is provided with a protruding squared shaft 47. In this form of the invention a key 48 is provided with a squared opening 49 much in the manner of the ordinary "skate key" which is adapted to engage with the protruding shafts 43, 44 and 47 to rotate the gears 41, 42 and 46, respectively, to release the frame sections from one another. The plate 28 may be placed within the frame in the manner above described and then held in position by turning the gears until the single-teeth engage with the racks adjacent.

While but certain forms of the invention have been shown and described herein, it will be readily apparent to those skilled in the art that many minor modifications may be made without departing from the spirit of the invention or the scope of the appended claims.

What is claimed is:

1. A license plate holder comprising a plurality of sections each interiorly grooved to receive the edges of a license plate and means for adjustably locking the sections one to another, said means comprising racks formed in certain of the sections, portions of the grooves of the other sections slidably receiving the racks, said other sections having recesses communicating with the grooves thereof, gears journaled in the recesses of said other sections in meshing engagement with the racks, and means for rotating the gears detachably connected thereto.

2. A license plate holder comprising a plurality of sections each interiorly grooved to receive the edges of a license plate and means for adjustably locking the sections one to another, said means comprising racks formed in certain of the sections, portions of the grooves of the other sections slidably receiving the racks, said other sections having recesses communicating with the grooves thereof, gears journaled in the recesses of said other sections in meshing engagement with the racks, means for rotating the gears detachably connected thereto, said last mentioned means comprising a key detachably fitting into the gears whereby the same may be turned.

3. A license plate holder comprising a plurality of sections each interiorly grooved to receive the edges of a license plate, means for adjustably locking the sections one to another, said means comprising racks formed in certain of the sections, single-toothed gears journaled in certain of said sections in cooperative relation each with a rack of another section, and means for individually rotating the gears to selectively vary the length and width of the holder.

4. A license plate holder comprising a plurality of sections each interiorly grooved to receive the edges of a license plate, means for adjustably locking the sections one to another, said means comprising racks formed in certain of the sections, single-toothed gears journaled in certain of said other sections in cooperative relation each with a rack of another section, and means for individually rotating the gears to selectively vary the length and width of the holder, said last mentioned means comprising a key adapted to fit within the gears whereby the same may be selectively meshed and unmeshed.

5. A license plate holder comprising a base section including a bottom bar having an upstanding end bar, an extensible section having a bottom bar, the bottom bar of the base section having an upwardly opening longitudinally extending channel for slidably receiving the bottom bar of the extensible section, said extensible section having an upstanding end bar remotely disposed to the end bar of the base section, said end bars having inwardly opening longitudinal channels, and a pair of extensible top sections each having a depending leg slidably disposed in one of the end bar channels and a top leg disposed at a right angle to its depending leg, said top legs extending toward one another, said top sections being internally grooved to receive portions of the top and side edges of a license plate, the bottom bar of the extensible section being grooved to receive a portion of the bottom edge of license plate, and means for retaining the extensible section and top sections in a plurality of adjusted positions.

6. A license plate holder as in claim 5, said retaining means comprising a plurality of rack and pinion units.

7. A license plate holder as in claim 5, said means comprising a plurality of rack and pinion units, and a key for detachably engaging and actuating each of said units.

CHARLIE F. SCHULTZ.

REFERENCES CITED

The following references are of record in the file of this patent:

UNITED STATES PATENTS

| Number | Name | Date |
|---|---|---|
| 1,524,848 | Thorn | Feb. 3, 1925 |
| 1,950,205 | Young | Mar. 6, 1934 |
| 2,042,768 | Bruns | June 2, 1936 |
| 2,106,015 | Ploster | Jan. 18, 1938 |
| 2,185,787 | Eckler | Jan. 2, 1940 |
| 2,213,909 | Heren | Sept. 3, 1940 |
| 2,388,349 | Storm et al. | Nov. 6, 1945 |